US010671762B2

(12) United States Patent
Gulati et al.

(10) Patent No.: US 10,671,762 B2
(45) Date of Patent: Jun. 2, 2020

(54) UNIFIED ADDRESSABLE MEMORY

(71) Applicant: Apple Inc., Cupertino, CA (US)

(72) Inventors: Manu Gulati, Saratoga, CA (US);
Joseph Sokol, Jr., San Jose, CA (US);
Jeffrey R. Wilcox, San Jose, CA (US);
Bernard J. Semeria, Palo Alto, CA
(US); Michael J. Smith, San Francisco,
CA (US)

(73) Assignee: Apple Inc., Cupertino ( * ) Notice: Subject to any disclaimer, the term of this patent is extended or adjusted under 35 U.S.C. 154(b) by 201 days.

(21) Appl. No.: 15/748,893

(22) PCT Filed: Aug. 25, 2016

(86) PCT No.: PCT/US2016/048697
§ 371 (c)(1),
(2) Date: Jan. 30, 2018

(87) PCT Pub. No.: WO2017/058414
PCT Pub. Date: Apr. 6, 2017

(65) Prior Publication Data
US 2019/0012484 A1 Jan. 10, 2019

Related U.S. Application Data

(60) Provisional application No. 62/234,275, filed on Sep. 29, 2015.

(51) Int. Cl.
*G06F 21/72* (2013.01)
*G06F 12/02* (2006.01)
(Continued)

(52) U.S. Cl.
CPC .......... *G06F 21/72* (2013.01); *G06F 12/0246* (2013.01); *G06F 12/1027* (2013.01);
(Continued)

(58) Field of Classification Search
CPC .. G06F 21/72; G06F 12/0246; G06F 12/1027;
G06F 12/1408; G06F 21/78; H04L
9/0861; H04L 9/0894
See application file for complete search history.

(56) References Cited

U.S. PATENT DOCUMENTS

2002/0169936 A1* 11/2002 Murphy .............. G06F 12/1009
711/205
2004/0221128 A1* 11/2004 Beecroft ............. G06F 12/1018
711/203
(Continued)

FOREIGN PATENT DOCUMENTS

EP          2226810 A1    9/2010
WO    2015/016918 A1    2/2015

OTHER PUBLICATIONS

Amirsoufi et al. Efficient Security-Aware Virtual Memory Management, Dec. 2008, International Conference of Soft Computing and Pattern Recognition, pp. 208-211 (Year: 2008).*
(Continued)

*Primary Examiner* — Kenneth W Chang
(74) *Attorney, Agent, or Firm* — Kowert, Hood, Munyon, Rankin & Goetzel, P.C.; Lawrence J. Merkel

(57) ABSTRACT

In one embodiment, a system includes a non-volatile memory that may serve as both the main memory system and the backing store (or persistent storage). In some embodiments, the non-volatile memory is divided into a main memory portion and a persistent portion. Data in the main memory operation may be encrypted using one or more first keys, and data in the persistent portion may be encrypted using one or more second keys, in an embodiment. The volatile behavior of main memory may be implemented by discarding the one or more first keys in a power down event or other event that indicates a loss of main memory data, while the one or more second keys may be
(Continued)

retained. In one embodiment, the physical address space of the non-volatile memory may be a mapping from a second physical address space that is used within the system.

19 Claims, 8 Drawing Sheets

(51) Int. Cl.
*G06F 12/1027* (2016.01)
*G06F 12/14* (2006.01)
*G06F 21/78* (2013.01)
*H04L 9/08* (2006.01)

(52) U.S. Cl.
CPC .......... *G06F 12/1408* (2013.01); *G06F 21/78* (2013.01); *H04L 9/0861* (2013.01); *H04L 9/0894* (2013.01); *G06F 2212/7206* (2013.01); *G06F 2212/7208* (2013.01); *G06F 2221/2143* (2013.01); *H04L 2209/12* (2013.01)

(56) References Cited

U.S. PATENT DOCUMENTS

| | | | | |
|---|---|---|---|---|
| 2005/0038973 | A1* | 2/2005 | Ito | G06F 12/1027 711/207 |
| 2006/0177064 | A1* | 8/2006 | Holtzman | G06F 21/77 380/277 |
| 2009/0019254 | A1* | 1/2009 | Stecher | G06F 12/1027 711/207 |
| 2009/0196418 | A1 | 8/2009 | Tkacik et al. | |
| 2009/0328131 | A1* | 12/2009 | Chaturvedi | G06F 11/1441 726/1 |
| 2010/0229005 | A1* | 9/2010 | Herman | G06F 12/1408 713/193 |
| 2012/0072713 | A1* | 3/2012 | Begum | H04L 9/0822 713/153 |
| 2012/0278564 | A1* | 11/2012 | Goss | G06F 12/0253 711/155 |
| 2012/0321077 | A1* | 12/2012 | Shiota | H04L 9/30 380/44 |
| 2013/0159602 | A1 | 6/2013 | Adams et al. | |
| 2013/0297948 | A1 | 11/2013 | Lee et al. | |
| 2014/0355754 | A1* | 12/2014 | Leung | H04L 9/0631 380/28 |
| 2015/0006911 | A1* | 1/2015 | Cochran | G06F 21/604 713/193 |
| 2015/0154119 | A1* | 6/2015 | Lee | G06F 12/1009 711/3 |

OTHER PUBLICATIONS

IPRP, PCT/US2016/048697, dated Apr. 3, 2018, 7 pages.
"Providing Safe, User Space Access to Fast, Solid State Disks," Adrian M. Caulfield, Todor I. Molloy, Louis Alex Eisner, Arup De, Joel Coburn, Steven Swanson, Computer Science and Engineering Department, University of Califomia, San Diego,{acaulfie,leisner,arde,jdcoburn,swanson}@cs.ucsd.edu, ASPLOS'12, Mar. 3-7, 2012, London, England, UK. 2012 ACM 978-1-4503-0759—Aug. 12, 2003, 13 pages.
"A Survey of Phase Change Memory (PCM)," Heather Garnell, Matthew Kocsis, Matthew Weber, Iowa State University—CPRE581, Dec. 2010, REVB, 16 pages.
"Implications of CPU Caching on Byte-addressable Non-Volatile Memory Programming," Kumud Bhandari, Dhruva R. Chakrabarti, Hans-J. Boehm, HP Laboratories,HPL-2012-236, External Posting Date: Dec. 6, 2012, 7 pages.
"Intel® Architecture, Instruction Set Extensions Programming, Reference," Memory Instructions, 319433-022, Oct. 2014, 11 pages.
"Operating System Support for NVM+DRAM Hybrid Main Memory," Jeffrey C. Mogul,Eduardo Argollo,Mehul Shah, Paolo Faraboschi, HP Labs, Palo Alto, CA 94304 and Barcelona, Spain, USENIX Association Berkeley, CA, USA © 2009, May 18-20, 2009, 5 pages.
"A Memory-Disk Integrated Non-volatile Memory System with its Dual Buffering Adapter," Mei-Ying Bian, Su-kyung Yoon, Shin-Dug Kim, Yonsei University, Feb. 24, 2013, 26 pages.
"NVM Duet: Unified Working Memory and Persistent Store Architecture," Ren-Shuo Liu, De-Yu Shen, Chia-Lin Yang, Shun-Chih Yu, Cheng-Yuan Michael Wang, Department of Computer Science and Information Engineering, Graduate Institute of Networking and Multimedia,Graduate Institute of Electronics Engineering, National Taiwan University, Taipei, Taiwan, Macronix International Co., Ltd., Hsinchu, Taiwan, ASPLOS '14, Mar. 1-4, 2014, Salt Lake City, Utah, USA, 15 pages.
"Architecting Phase Change Memory as a Scalable DRAM Alternative," Benjamin C. Lee, Engin Ipek, Onur Mutlu, Doug Burger, Computer Architecture Group Microsoft Research, Computer Architecture Laboratory Carnegie Mellon University, ISCA'09, Jun. 20-24, 2009, Austin, Texas, USA, 12 pages.
"Toward a Universal Memory," Johan Åkerman, Apr. 22, 2005 vol. 308 Science www.sciencemag.org, 4 pages.

* cited by examiner

UNIFIED ADDRESSABLE MEMORY

This application is a 371 of PCT Application No. PCT/US2016/048697, filed Aug. 25, 2016, which claims benefit of priority to U.S. Provisional Patent Application Ser. No. 62/234,275, filed on Sep. 29, 2015. The above applications are incorporated herein by reference. To the extent that any material in the incorporated application conflicts with material expressly set forth herein, the material expressly set forth herein controls.

BACKGROUND

Technical Field

Embodiments described herein are related to systems using a non-volatile memory as a main memory.

Description of the Related Art

The storage hierarchy in various systems has generally included a main memory formed from dynamic random access memory and a backing store form from non-volatile memory of some type (e.g. Flash memory, other non-volatile solid state memory, magnetic storage, optical storage, etc.). The main memory is accessed using an address space, and agents with access to the main memory may uses addresses within the address space to specify locations with the main memory for a particular access. The backing store is addressed through a file system that is typically part of the operating system or under control of the operating system. Typically, data is moved from the backing store into the main memory for access by the agents.

SUMMARY

In one embodiment, a system includes a non-volatile memory that may serve as both the main memory system and the backing store (or persistent storage). The non-volatile memory may be accessed using a physical memory address space, and thus reads and writes to the non-volatile memory may be performed by agents to either main memory or persistent storage without intervention by a file system, in an embodiment. In some embodiments, the non-volatile memory is divided into a main memory portion and a persistent portion. Data in the main memory portion may be encrypted using one or more first keys, and data in the persistent portion may be encrypted using one or more second keys, in an embodiment. The volatile behavior of main memory may be implemented by discarding the one or more first keys in a power down event or other event that indicates a loss of main memory data, while the one or more second keys may be retained to ensure access to the persistent storage.

In one embodiment, the physical address space of the non-volatile memory may be a mapping from a second physical address space that is used within the system. For example, the second physical address space may be a mapping from a virtual address space or spaces used by the agents in the system. The mapping from virtual address to a second physical address in the second physical address space, and from the second physical address to a first physical address in the physical address space of the non-volatile memory, may permit fine grain control of access to memory. For example, a smaller page size maybe used in the second physical address space than is used in the physical address space of the non-volatile memory.

BRIEF DESCRIPTION OF THE DRAWINGS

The following detailed description makes reference to the accompanying drawings, which are now briefly described.

Figure 1:
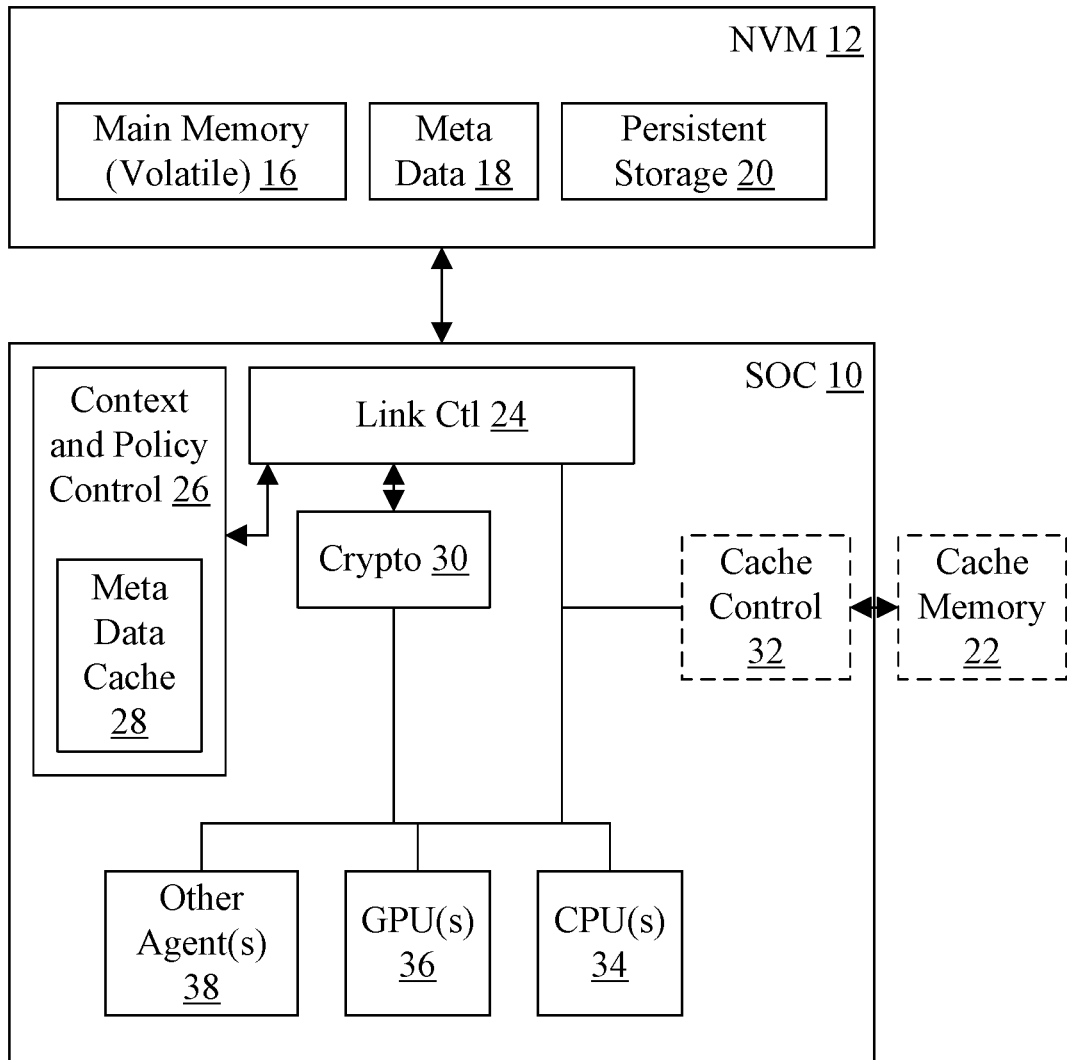
FIG. 1 is a block diagram of one embodiment of a system including non-volatile memory as a system memory.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Various systems disclosed herein implement a memory hierarchy including a main memory that is formed from non-volatile memory (NVM) rather than dynamic random access memory (DRAM). The NVM system memory may be directly addressable by code executing on processors in the system and by various other agents in the system, such as peripheral devices. That is, the NVM system memory may be part of the memory address space, and thus may be read and written through one or more address translation data structures. Other than managing the address translation data structures, control software such as an operating system may not be involved and reading and writing the NVM system memory.

In some embodiments, the system may include a non-volatile memory solution such as NAND or NOR Flash memory. The Flash memory may be controlled by file system software in the system and/or a file input/output (I/O) controller. That is, other software and hardware such as the various agents mentioned above may not directly address the Flash memory, but rather may do so through calls to the file system. The file system may manage the storage of files on the Flash memory, and may implement various Flash memory management techniques such as wear leveling, bad block management, bit error rate management, etc. In other embodiments, the Flash memory may be eliminated and the main memory may be the only mass storage in the system. Because the main memory is non-volatile, such a system may retain data over power down cycles.

In an embodiment, the NVM system memory may have properties that are higher performance than other forms of NVM, such as Flash memory. For example, the read latency of the NVM system memory may be one or more orders of magnitude lower than Flash memory. The read latency of the NVM system memory may be within an order of magnitude of DRAM. The bandwidth of the NVM system memory may exceed that of Flash but may be less than DRAM. The power to access the NVM system memory may be significantly less than Flash but may be higher than DRAM. The density, or capacity, of the NVM may be similar to that of Flash and greater than that of DRAM. In an embodiment, the NVM system memory may be NAND Flash or NOR Flash, including 3D NAND Flash, but in other embodiments, other types of non-volatile memories may be used as the NVM system memory. The other types of non-volatile memory include resistive RAM (ReRAM or RRAM), phase change memory (PCM) may be used. Conductive bridge RAM (CBRAM) may be used. Various forms of magnetic RAM (MRAM) spin transfer torque (STT) RAM, Ferroelectric RAM (FRAM or FeRAM), Silicon Oxide Nitride Oxide Silicon (SONOS) memory, or NanoRAM (memory made from nanostructures such as nanowires).

Data stored in the NVM may be persistent. That is, the expectation when writing the data to the NVM is that the data will remain stored there (unless overwritten by subsequent write operation) for the life of the system. On the other hand, volatile memory such as DRAM or static RAM (SRAM) may store data temporarily. If the system is powered off, or if another state in the system is established that is defined to have a clean volatile memory, the data in the volatile memory is discarded. Data stored in a non-volatile memory may be unperturbed over power down/power up cycles, whereas data in volatile memory may be lost in power down/power up cycles. That is, data written to the volatile memory prior to the discard event is not expected to be available after the discard event occurs.

Memory Hierarchy

Figure 2:
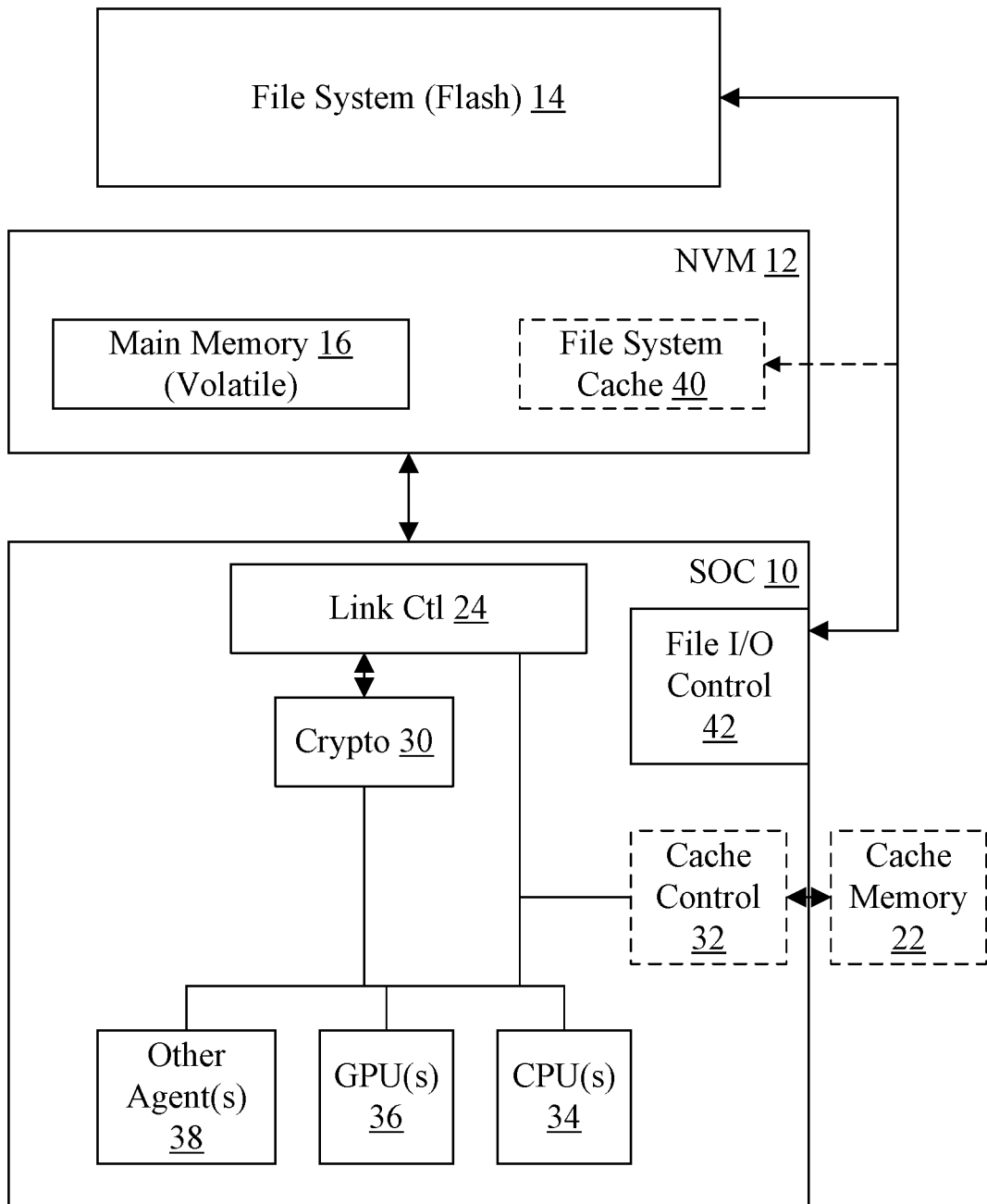
FIG. 2 is a block diagram of another embodiment of a system including non-volatile memory as system memory.

FIGS. 1 and 2 illustrate various embodiments of systems employing NVM as the system memory. The general idea of a memory hierarchy employing an NVM as system memory and also serving as persistent storage (e.g. as shown in FIG. 1) or NVM as system memory (and optional file system cache) with another memory storing the file system (e.g. as shown in FIG. 2) may be known. However, many aspects of how to implement the system, make the system memory operate as volatile memory even though the memory device is non-volatile, handle errors/failures in the memory, etc. may be described herein and are believed to be novel and non-obvious.

FIG. 1 is a block diagram of one embodiment of a system 2. The system 2 as shown in FIG. 1 may include a system on a chip (SOC) 10, and an NVM 12. The NVM 12 may form the system memory in the system 2, illustrated in FIG. 1 as the main memory block 16. The main memory block 16 may be considered volatile by software that executes on the system and by the agents in the system, as indicated in parentheses in FIG. 1. The NVM 12 may further include metadata 18 and a persistent storage 20 in some embodiments. In the illustrated embodiment, the SOC 10 includes a link control circuit 24, a context and policy control circuit 26, a metadata cache 28, a cryptographic (crypto) circuit 30, one or more processors including one or more central processing units (CPUs) 34 and/or one or more graphics processing units (GPUs) 36, and one or more other agents 38. The CPUs 34, GPUs 36, agents 38, link control circuit 24 and crypto circuit 30 are coupled as illustrated in FIG. 1. The context and policy control circuit 26 is coupled to the link control circuit, which is coupled to the NVM 12.

The link control circuit 24 may be configured to communicate with the NVM 12 on the interface defined by the NVM 12. Thus, the link control circuit 24 may be similar to an NVM controller that might be used to interface to various NVMs. However, the link control circuit 24 is also configured to receive memory reads and writes from the CPUs 34, GPUs 36, and agents 38 in a manner similar to a memory controller that is coupled to DRAM. That is, the memory reads and writes include addresses in the physical address space used to access the NVM 12 (or the link control circuit 24 includes translation circuitry to translate the address to the physical address). By way of contrast, reads and writes to the Flash memory 14 (see FIG. 2) may involve setting up control registers to perform the read or write and then the controller to the Flash memory 14 (e.g. the file I/O controller 42 shown in FIG. 2) performing the read or write transfer based on the control register settings. The interface to the flash memory 14 may be controlled by file system software, whereas the memory reads and writes to the NVM 12 may be managed through the address translation data structures but otherwise may be issued by any agent in the system (including CPUs 34, GPUs 36, and/or agents 38). Viewed in still another way, the main memory 16 and the remainder of the NVM 12, including, e.g. the persistent storage 20 and the metadata 18, may be addressed using different addresses in the same physical address space.

Software may manage the persistent storage 20, which is expected to maintain data written into the storage for the life of the system (unless subsequently overwritten by the software). For example, a file system may be implemented in the persistent storage 20. However, the file system may be a software mechanism only, and files may be accessed by addresses in the address space of the NVM 12. That is, a file access or other access in persistent storage 20 may be an address used by a load/store instruction to read/write addresses in the range of NVM addresses assigned to the persistent storage 20, similar to accesses to main memory 16.

As mentioned above, the main memory 16 may be defined to be volatile even though the underlying storage technology is non-volatile. One embodiment of a mechanism to provide volatile behavior is to encrypt the data in the main memory 16 using one or more keys generated randomly during operation. For example, software may generate and manage the keys for the main memory 16. When the system is powered off or otherwise brought to a state in which the data in the main memory 16 is not guaranteed or is defined to be discarded, the keys may be discarded by software and thus the data may not be decrypted again. The crypto circuit 30 may perform the encryption/decryption of the main memory data and thus may have access to the keys during operation. Other embodiments may implement the volatility in different fashions and thus the crypto circuit 30 may be optional.

The data in the persistent storage 20 may also be encrypted/decrypted or in plain text (non-encrypted), as desired. Generally, different keys may be used for the persistent storage 20 and the main memory 16. Various other data may be used for the encryption as well. For example, the encryption may be performed on blocks of data. That is, the unit of encryption may be a block, and a block may be encrypted/decrypted as a unit but multiple blocks may be encrypted/decrypted independently. Each block may have an initial vector used for the encryption. Various other metadata may be included as well. The metadata 18 may include the metadata (initial vectors, keys, etc.) for the persistent storage 20. The metadata 18 may be persistently stored as well, and thus may be retained for the life of the system. Accordingly, even though the persistent storage 20 may be encrypted, it may be accessible between power up/power down cycles. In an embodiment, the metadata 18 may or may not be encrypted as well. If the metadata 18 is encrypted, in an embodiment, a device-specific key that may be reliably generated at each boot (e.g. the device-specific key may be fused into the SOC 10 or may be generated from fused values and other predictable values such as a seed or seeds) may be used for the encryption.

The context and policy control circuit 26 may maintain the keys and other metadata for the persistent storage 20 during use. The context and policy control circuit 26 may optionally include the metadata cache 28 to cache recently used metadata 18, which may permit more rapid access to the persistent storage 20.

While the read latency of the NVM 12 may be significantly lower than that of Flash memory, in some embodiments it may not be as low as DRAM read latency. In order to provide an effective memory latency that is near DRAM, a relatively large cache memory 22 may optionally be provided. In an embodiment, the cache memory 22 may be DRAM, although other types of RAM such as SRAM may also be used. The cache memory 22 is external to the SOC 10 in this embodiment, although the cache memory 22 may be embedded within the SOC 10 in other embodiments (e.g. using an embedded DRAM (eDRAM) manufacturing process, manufacturing the embedded DRAM in a logic process, or using an SRAM). A high hit rate for the cache (e.g. at least 90%) may be targeted to achieve the desired effective memory latency. Various features may be employed to improve the hit rate. For example, a wide set associative cache may be employed. Various cache hints may be included in read/write memory operations to indicate how the data should be cached (or not). In an embodiment, a cache on the order of 1 GB in size may be used, although larger or smaller sizes may be selected.

In one embodiment, the cache tags for the cache memory 22 may be stored on the SOC 10 (e.g. as part of a cache control circuit 32 coupled to the link control circuit 24 and the agents 34, 36, and 38). In such an embodiment, if the system 2 supports a "suspend to RAM" mode in which the SOC 10 is powered down but the contents of main memory 16 are retained, the cache tags would be lost and thus the system would need to reload data into the cache memory 22 when the SOC 10 is powered up again. An embodiment is contemplated in which a portion of the cache memory 22 is reserved for the tags. The tags may be written by the cache control circuit 32 to the cache memory 22, which may remain powered in suspend to RAM mode. The tags may be copied back after the SOC 10 is powered up again, retaining the data that was cached prior to the entry into suspend to RAM mode.

The CPUs 34 may be processors that execute the control software in the system (e.g. operating system software, device drivers, boot code, file system software, other privileged software, etc.). The CPUs 34 may also execute unprivileged code such as application programs. The GPUs 36 may execute graphics software such as rendering software, shading software, texturing software, etc. Thus, the GPUs 36 may be special purpose processors. Other types of processors may also be included (e.g. digital signal processors (DSPs), microcontrollers, etc.). The software executing on the various processors may include load/store instructions, and the processors may generate read/write memory operations to the main memory 16 responsive to the load/store instructions. The agents 38 may include various other memory operation sources. For example, various peripheral devices may read and write the main memory. Generally, the processors 34 and 36, other processors, and other agents 38 may be collectively referred to as "agents." An agent may be a source of memory operations.

In some cases, the agent may generate a virtual address, which may be translated through an address translation mechanism to a physical address. The physical address may identify a location in the main memory 16, or may be translated through a second address translation data structure to a physical address in the main memory 16. In cases in which an intermediate physical address is generated and translated through the second address translation structure, the cache 22 may be addressed using the intermediate physical address or the memory physical address. Additional details regarding the address translation structures are provided below. Other agents may generate a physical address directly, or may generate the intermediate physical address directly.

FIG. 2 is another embodiment of the system 4 including the NVM 12, the SOC 10, the cache memory 22 (optionally), and a Flash memory 14 that may serve as a file system in the system 4. The Flash memory file system 14 is coupled to the SOC 10, as is the NVM 12 and the cache memory 22. The SOC 10 may include the link control circuit 24, the crypto circuit 30, the cache control circuit 32 (optionally), the CPUs 34, the GPUs 36, and the other agents 38. The description of the NVM 12 and the components of the SOC 10 above for FIG. 1 may generally apply to the like-numbered elements of FIG. 2. Additionally, a file I/O controller 42 may be included, which may be coupled to the Flash memory file system 14.

The NVM 12 may thus include the main memory may optionally include a file system cache 40 for the file system in the Flash memory 14. The file system software executing on the SOC 10 may control access to the file system cache 40, and may manage the file system cache 40. Because the read latency from the NVM 12 may be less than that of the Flash memory 14, the file system cache 40 may improve performance by reducing access time to currently accessed and/or frequently accessed files. Additionally, lower power access to the files may be possible from the file system cache 40.

The file I/O controller 42 may manage access to the file system, and thus may control access to the Flash memory 14 and may also access the file system cache 40, if implemented. The file I/O controller 42 may include a Flash memory interface control circuit, which may include hardware to directly communicate with the Flash memory 14. The Flash memory 14 may have a dedicated Flash memory interface, in some embodiments. In other embodiments, the Flash memory 14 may be coupled to a peripheral interface such as a Peripheral Component Interconnect (PCI)-compatible interface and the control circuit may be a PCI controller such as a PCI express (PCIe) controller. The file I/O controller 42 may further include an processor executing software and/or may include the CPUs 34 executing file system software, for example.

Figure 3:
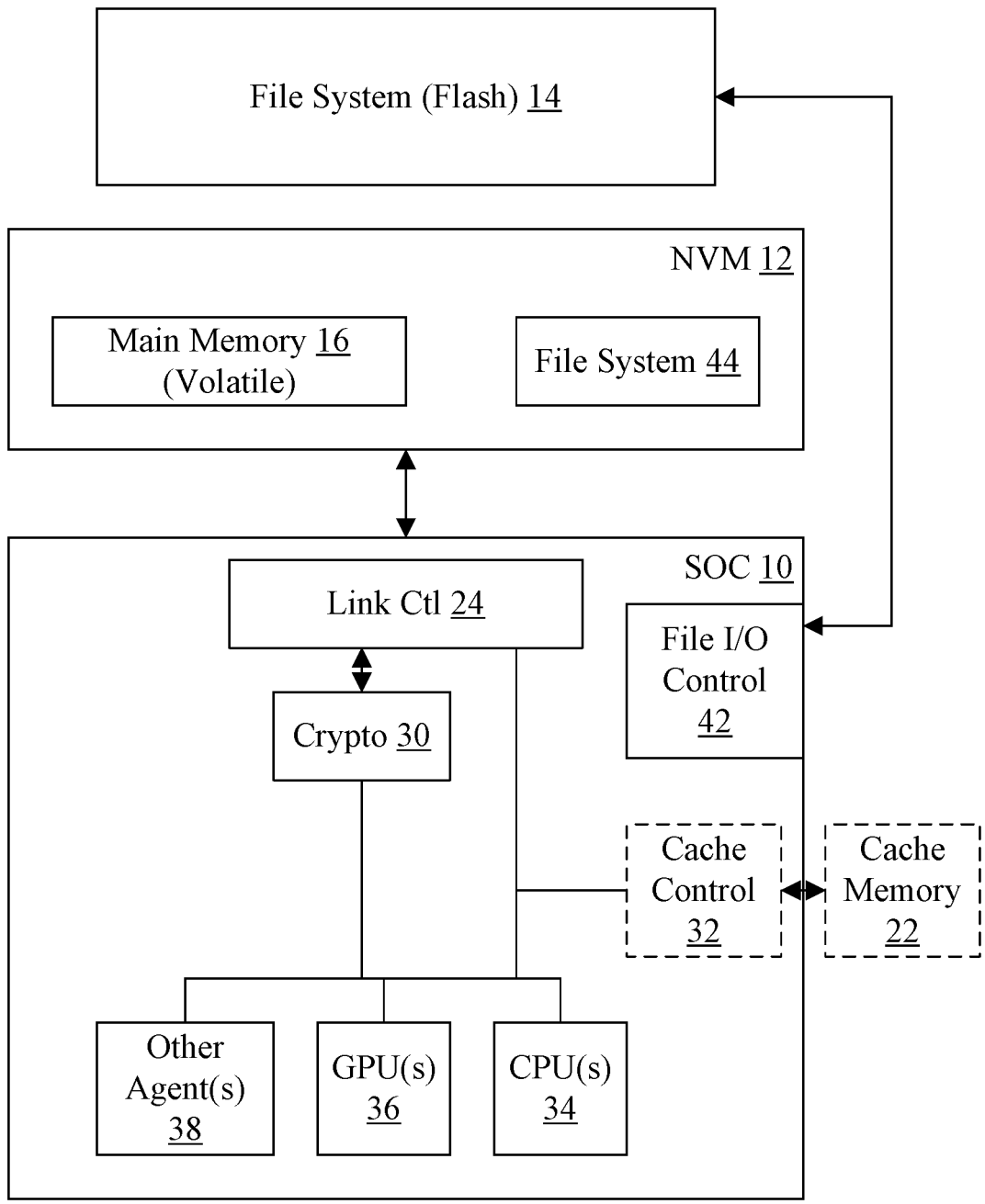
FIG. 3 is a block diagram of still another embodiment of a system including non-volatile memory as system memory.

While Flash memory 14 is shown in FIG. 2, other forms of NVM may be used for the file system in other embodiments. While the embodiments of FIGS. 1 and 2 illustrated examples of systems in which the NVM 12 may be employed, numerous other variations may be used as well. For example, in an embodiment of the system of FIG. 2, the NVM 12 may include a file system as well. The file system in the NVM 12 and the file system Flash memory 14 may be physically separate, but may be managed by software as a single file system. Frequently-accessed files or files that are latency-sensitive may be allocated to the file system in the NVM 12 and other files may be allocated to the Flash memory 14. FIG. 3 is an example of such a system 6, showing a file system 44 in the NVM 12 as well as the file system in the Flash memory 14.

Address Translation

Figure 4:
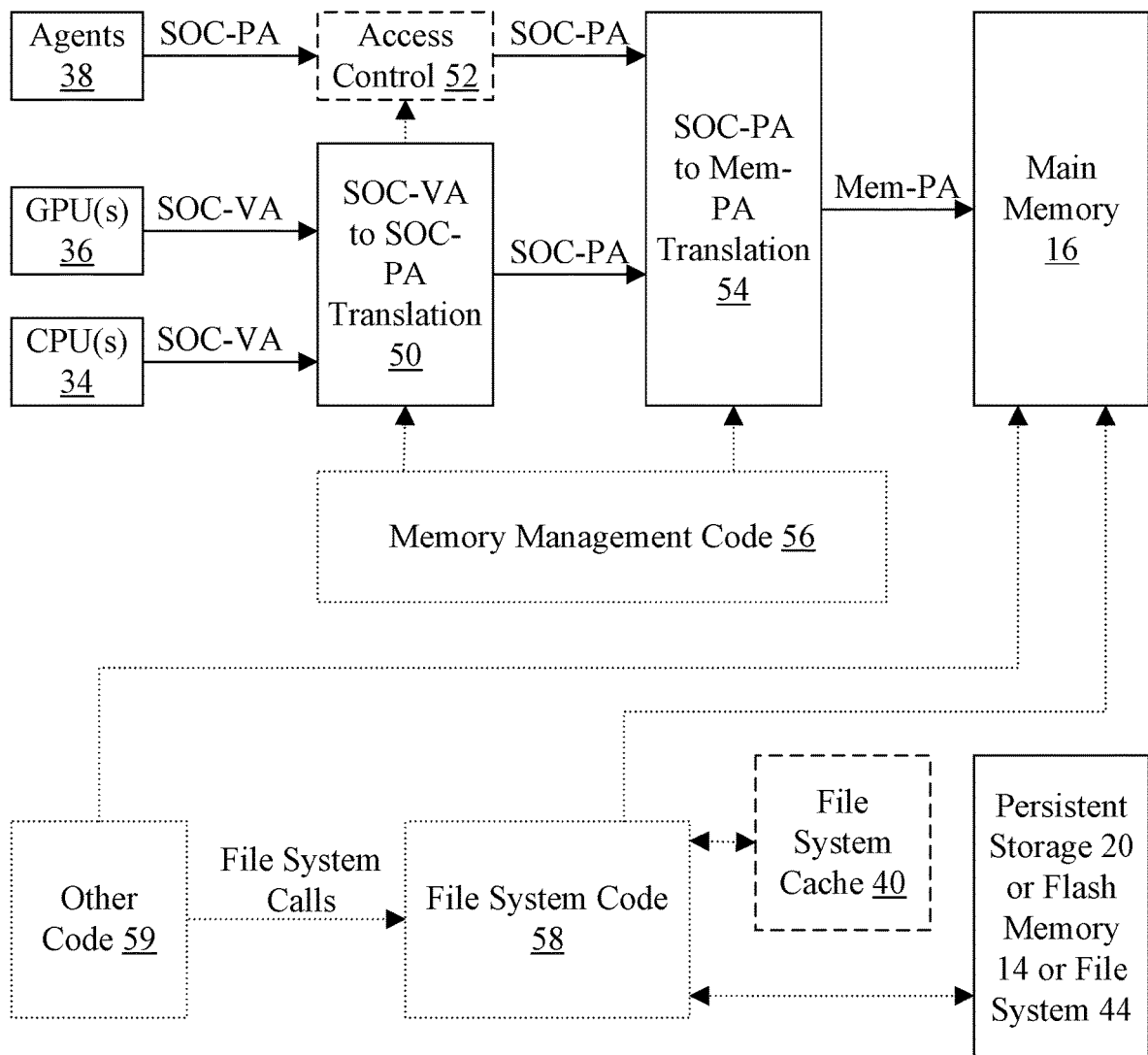
FIG. 4 is a block diagram illustrating one embodiment of address translation in a unified addressable memory system and file system access.

Turning now to FIG. 4, a block diagram is shown of one embodiment of address translation structures that may be used in an embodiment of a system such as the systems illustrated in any of FIGS. 1-3. As shown in FIG. 4, the CPUs 34 and GPUs 36 may be coupled to an SOC-virtual address (SOC-VA) to SOC-physical address (SOC-PA) translation data structure 50, which is further coupled to an SOC-PA to memory-PA (Mem-PA) translation data structure 54. The agents 38 are also shown coupled to an optional access control data structure 52, which is further coupled to the SOC-PA to Mem-PA translation data structure 54.

The CPUs 34 and GPUs 36 may typically operate in a virtual address space (SOC-VA), which is translated through the SOC-VA to SOC-PA translation mechanism to an SOC-PA. The data structure 50 may be maintained by control software executing on the CPUs 34 (e.g. operating system software or other memory management software, shown as memory management code 56 in FIG. 4) to protect data belonging to different processes from each other, to permit demand paging of data into memory from persistent storage 20 or Flash memory 14, etc. The SOC-PA may be a physical address space within the SOC 10. In an embodiment, the cache memory 22 (if included) may be addressed in the SOC-PA address space, although other embodiments may address the cache memory 22 in the Mem-PA address space. Other caches (e.g. within the CPUs 34/GPUs 36 or between the CPUs 34/GPUs 36 and the interface to the cache control circuit 32 and the link control circuit 24) may be addressed in the SOC-PA address space in an embodiment.

The CPUs 34 and/or GPUs 36 may have modes in which address translation from SOC-VA to SOC-PA is disabled (and thus the CPUs 34/GPUs 36 may generate SOC-PA addresses directly). For example, when an interrupt is signaled, address translation may be disabled in the processor that accepts the interrupt. When a processor exits reset, it may be operating with address translation disabled. During times that a processor is executing with address translation disabled, the processor may effectively bypass the SOC-VA to SOC-PA translation data structure 50 and the addresses generated by the processor may be SOC-PA addresses.

The translations in the SOC-VA to SOC-PA translation data structure 50 and corresponding address translation mechanism may be defined according to the instruction set architecture implemented by the CPUs 34 and GPUs 36. The translation data structures for the CPUs 34 may differ from the GPUs 36, in some embodiments, in which case separate data structures may be used. In other embodiments, the translation mechanism may not be explicitly specified by the instruction set architecture. In general, there may be translation hardware implemented in the processors to support translation. For example, the translation hardware may include one or more translation lookaside buffers (TLBs) that cache translation data from previously used translations. The translation hardware may further include circuitry that may access the translation data structure (i.e. perform a "table walk") in the event of a TLB miss for a given SOC-VA. Any hardware supporting the translation mechanism may be implemented in various embodiments.

The agents 38 may generate SOC-PA addresses directly. In some cases, a given agent 38 may generate SOC-VA addresses and may use a translation structure similar to the structure 50 to translate to an SOC-PA address. For those agents 38 that generate SOC-PA addresses directly, an optional access control mechanism may be employed to control the access of the agents 38 to particular SOC-PA addresses. The access control mechanism 52 may include data similar to the translation data structure 50, except that the data is accessed by SOC-PA instead of SOC-VA and the address is not changed, but the permission data may be checked.

The SOC-PA addresses may be translated to Mem-PA addresses through the translation data structure 54. The mechanism for translating the SOC-PA to Mem-PA may be similar to the mechanism for translating from SOC-VA to SOC-PA, at least at a high level. The content of the SOC-PA to Mem-PA translation data structure 54 may be managed by the same control software 56 (e.g. the operating system) that maintains the translation data structures 50, or may be separate control software.

By providing a second level of translation, the SOC-PA to Mem-PA mechanism may permit an independent page size for the Mem-PA address space as compared to the SOC-PA address space. For example, the Mem-PA page size may be set to match the page size of the NVM 12, in an embodiment. On the other hand, the page size for the SOC-PA address space may depend on the address translation mechanism defined by the instruction set architecture and/or a previous implementation of the CPUs 34/GPUs 36. For example, a page size of 4 kilobytes (kb) or 8 kb may be supported in the translation data structure 50, or multiple sizes may be supported, in various embodiments. On the other hand, a page size of 16 kb may be supported in the translation data structure 54 to match a 16 kb page size in the NVM 12, in an embodiment. Any page sizes may be supported in either translation mechanism in various embodiments.

Additionally, the second level of translation may permit backward compatibility of the first level of translation (translation data structure 50) with previous versions of the CPUs 34/GPUs 36. For example, a certain maximum physical address size based on DRAM system memory implementations may be provided in the translation data structure 50. A larger physical address size may be supported in the NVM 12, which may not be specifiable in the translation data structure 50.

In an embodiment, the translation hardware that walks the SOC-PA to Mem-PA translation data structure 54 and provides the second level of translation may be implemented in the link control circuit 24. That is, the link control circuit 24 may include a TLB, table walking circuitry for the translation data structure 54, etc. Alternatively, circuitry between the link control circuit 24 and the CPUs 34/GPUs 36/agents 38 may implement the translation hardware.

Other embodiments may implement a single level of translation. Furthermore, in some embodiments, the result of translating from the SOC-VA to the SOC-PA and then to the Mem-PA may be cached in a TLB or other such structure to translation from the SOC-VA to the Mem-PA in a single translation look up, even though two levels of translation are performed. For example, TLBs in the CPU 34/GPU 36 (not shown in FIGS. 1 and 2) may cache a translation from the SOC-VA to the SOC-PA.

Also illustrated in FIG. 4 is access to the file system in the persistent storage 20 and/or the flash memory file system 14. As illustrated, access to the file system may be performed through a file system manager (file system code 58 in FIG. 4). While CPUs 34, GPUs 36, and agents 38 may directly access the main memory 16 through the address spaces described above, requests to access the file system (e.g. from various other code 59 executing on the system such as applications and/or operating system code outside of the file system code 58) may generate calls to the file system code, which may move data from the file system into the main memory 16 for access. The other code 59, executing on the CPUs 34 or the GPUs 36, may then access the data from the main memory 16. The file system cache 40, if included, may be managed by the file system code 58 as well. The file system code 58 may be executed by the CPUs 34, logically forming part of the file I/O controller 42. In other embodiments, the file system code 58 may be executed in the file I/O controller 44 (e.g. the file I/O controller 44 may include a processor). In still other embodiments, the file system code 58 may instead be implemented in hardware in the file I/O controller 44. Any combination of hardware and memory storing instructions may be used to implement the file I/O controller 44.

As mentioned previously, in embodiments such as FIG. 1 in which the NVM 12 stores both the volatile main memory 16 and persistent storage 20, accesses to files and other persistently stored data may be performed via Mem-PA addresses as well. That is, the file system code 58 may be eliminated and the other code 59, executing on CPUs 34 and/or GPUs 36 for example, may directly access the files in the persistent storage 20 in the same way the data in the system memory 16 is accessed, through the address translation data structures 50 and 54. Protection of the data in the persistent storage 20 may be provided through controlling the existence of translations to the memory locations in the NVM 12 allocated to the persistent storage 20. In some embodiments, the notion of a file may be eliminated from the software in the system and memory locations may be viewed as persistent or non-persistent (volatile).

Figure 5:
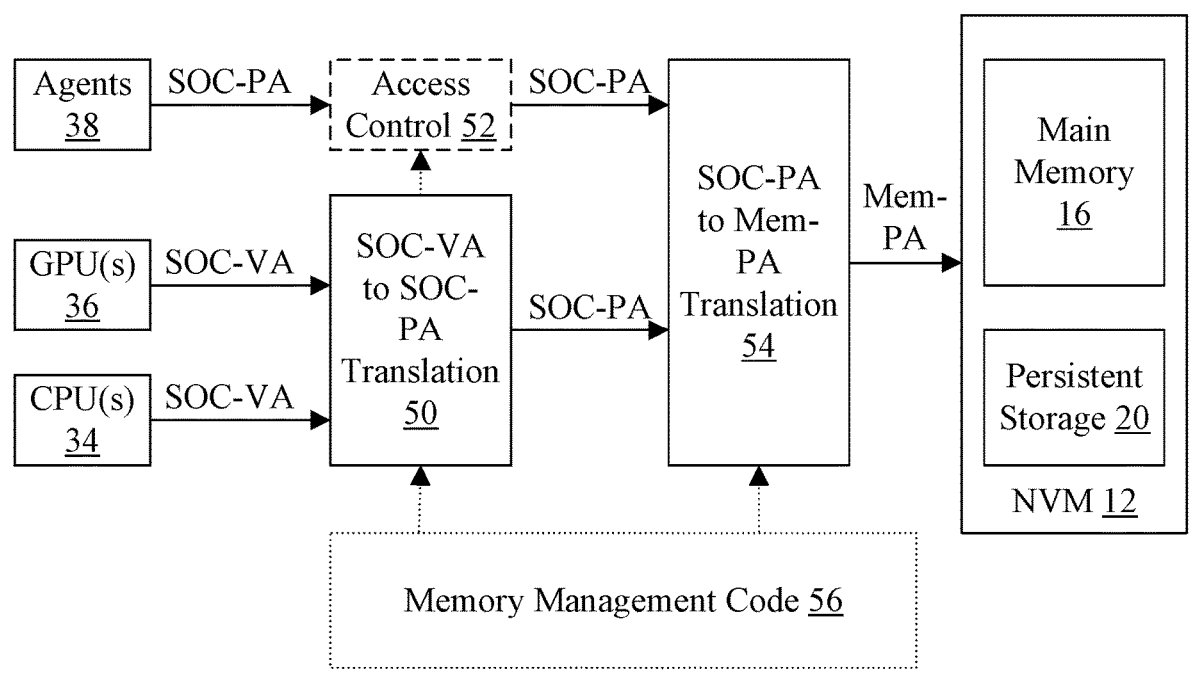
FIG. 5 is a block diagram illustrating another embodiment of address translation and access to both volatile main memory and persistent storage, both in a non-volatile memory.

FIG. 5 is a block diagram of one embodiment such a system. In the illustrated embodiment, the GPUs 36 and CPUs 34 generated SOC-VA addresses to access data in either the main memory 14 or the persistent storage 20. The translation data structures 50 and 54 may translate the SOC-VA to a Mem-PA that accesses a location in the main memory 16 or the persistent storage 20. The agents 38 may generate SOC-PA addresses that are controlled through the access control 52 data structure and the translation data structure 54. The memory management code 56 may manage the data structures 50, 52, and 54 to permit or prevent access to a given location in the NVM 12, whether it is main memory 16 or persistent storage 20, as desired. Thus, controlling software such as operating system software may maintain access policies, e.g., by maintaining per-file encryption keys and associating any desired access policies via the key. The controlling software may enforce the access policies via the presence or absence of a translation in the data structures 50, 52, and 54. Some additional access policy control may be provided via control bits in the translation, in some embodiments (e.g. a file may be read-only or writeable via control bits in the translation).

Figure 6:
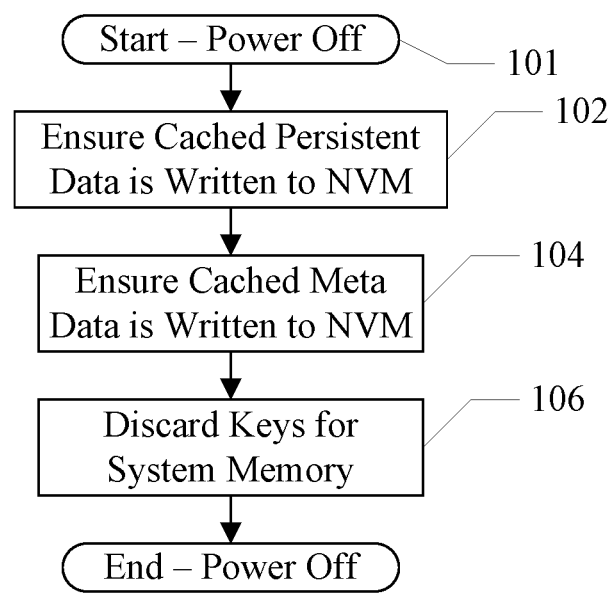
FIG. 6 is a flowchart illustrating operation of one embodiment of the system to power off.

FIG. 6 is a flowchart illustrating operation of the system when entering a state that the main memory contents are expected to be lost. A power down event, when the system is being turned off, is one such state. Other embodiments may include additional states in which the main memory contents are lost. While the blocks are shown in a particular order for ease of understanding, other orders may be used. Blocks may be performed in parallel in combinatorial logic in the system. Blocks, combinations of blocks, and/or the flowchart as a whole may be pipelined over multiple clock cycles. The system may be configured to implement the operation illustrated in FIG. 6. The operation illustrated in FIG. 6 may be implemented in the link control circuit 24, the NVM 12, controlling software stored in a memory and executable by a processor in the system, or a combination thereof. For simplicity below the system will be referred to as implementing the operation. Operation as shown in the flowchart begins at block 101.

The system may be configured to ensure that any persistently stored data (data being written to the persistent storage 20, for example, in FIG. 1 or the flash memory 14 in FIG. 2) has been written to the memory (block 102). Additionally, the system may be configured to ensure that any related meta data 18 has been written (block 104). The keys corresponding to the system memory 16 may be expressly discarded (not stored in non-volatile storage), thus making the system memory 16 unreadable (block 106). That is, the encrypted data may be read but the corresponding actual data may not be discerned from the encrypted data. In this manner, the volatility of the system memory may be modeled.

Ordering and Synchronization

In an embodiment, the SOC 10 may support one or more mechanisms to enforce ordering of writes to the NVM 12. For example, metadata 18 is removed as part of removing access to a file in the persistent storage 20. Metadata 18 may also be removed when reclaiming SOC-PA space. Before the metadata 18 can be removed, any data that depends on it is cleaned out of the system. When shutting down or ensuring data is available to an external agent, data may be flushed to the NVM 12. For crash recovery, knowing the order in which data became persistent allows for the reconstruction of storage contents.

In an embodiment, hardware provides mechanisms for one or more of the following use cases:

1. A mechanism to clean data out of the cache hierarchy and past the TLB for the SOC-PA to Mem-PA translations, so that it is safe to remove its related metadata 18.
2. A mechanism to ensure the completion of each of one group of writes to the NVM 12 before the completion of any write of another group of writes.
3. A mechanism to ensure that a group of writes to persistent storage have completed.

For a given SOC-PA, a "point of independence" (PoI) may be defined as the point where a transaction headed towards the NVM 12 no longer requires metadata 18 in order to be successfully completed. A complete to PoI operation may be used to clean, or clean-and-invalidate, data past the PoI. A response to a complete to PoI operation implies that the cache line(s) in question are no longer present in any of the on-chip caches, fabric or local buffers, and that it has performed its lookup in the TLB for the SOC-PA to Mem-PA. The cache line(s) could be present in buffers between the TLB and NVM 12 in some embodiments.

A Fence operation may insert a barrier into write queues beyond the PoI such that write operations passing the PoI before the barrier is inserted complete to the NVM 12 before those write operations passing the PoI after the Fence. The response to Fence may be sent once the barrier has been inserted into each queue the may exist past the PoI.

A Drain operation may insert a barrier into write queues beyond the PoI such that all write operations passing the PoI before the barrier is inserted complete to NVM 12 before the response is sent for the Drain operation.

Exemplary Boot Flows

A cold boot may be a boot from the system being in a completely powered down state. A warm boot may be performed from the system being in a low power state in which an always-on portion of the SOC 10 is on but the rest of the SOC 10 is powered down and a state of the system is maintained from prior to the power down in the main memory 16.

Figure 7:
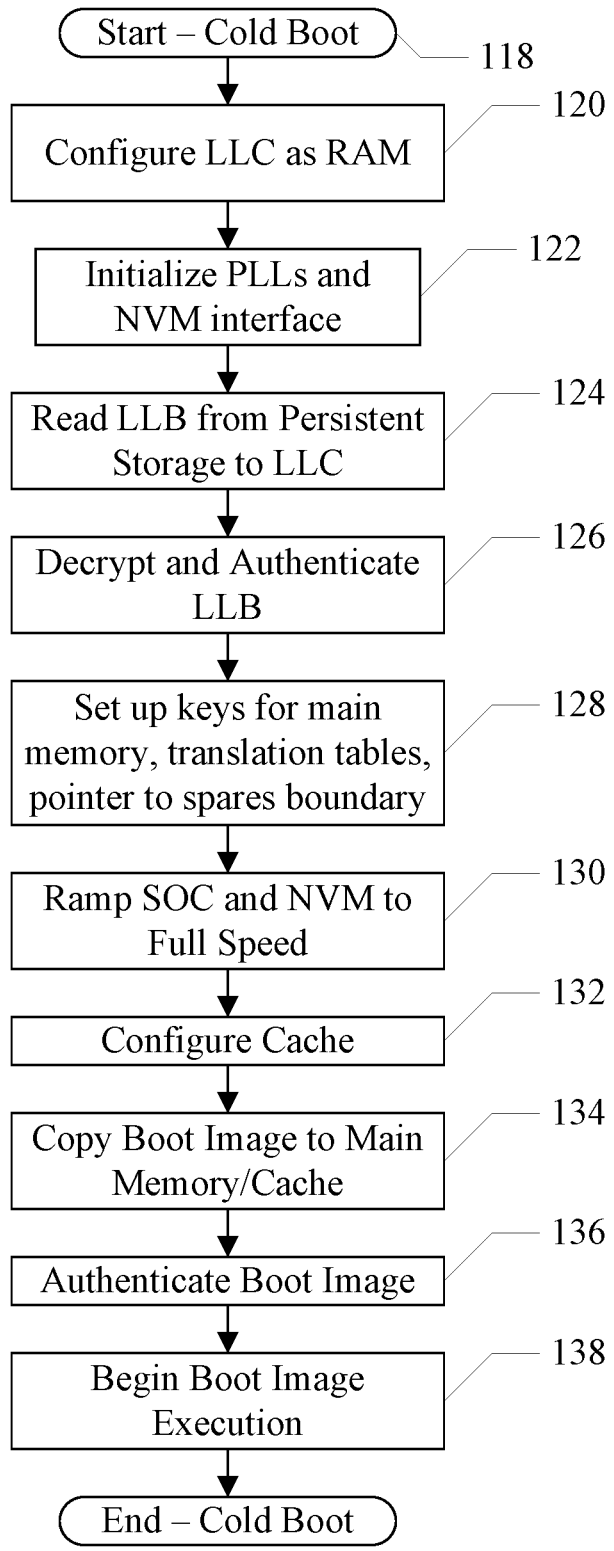
FIG. 7 is a flowchart illustrating one embodiment of a cold boot of the system.

In some embodiments, cold boot of the system may operate in a fashion similar to that illustrated in the flowchart of FIG. 7 for an embodiment, beginning at block 119 with the reset vector in the CPU 34 pointing to a secure ROM in the system 2, 4, or 6 (not shown). The secure read-only memory (ROM) may be protected from access by other agents in the system so that the code therein may not be easily visible to a third party observer. The code in the secure ROM, when executed by the CPU 34 may configure a last level cache (LLC) of the CPU 34 (e.g. the lowest level of cache before the link control circuit 24, not shown) in an LLC-as-RAM mode (which gives a software executing on the CPU 34 the ability to control which addresses are stored in the LLC) (block 120). The code may use the LLC-RAM as scratch memory. It initializes phase lock loops (PLLs) and the interface to the NVM 12 at a known-safe speed (block 122). An encrypted first-stage boot image (known as low level boot (LLB)) is loaded from a location in persistent storage 20 known to the code into the LLC-RAM. At this point, the translation lookaside buffer (TLB) and the translation data structures have not been initialized. Therefore, SOC 10 may use a "bypass crypto" mode that does not decrypt the LLB image as it is loaded into memory. The NVM 12 may only be read in this step, not written (block 124). The code may then decrypt and authenticate the LLB (block 126). The LLB code is aware of the partitioning of NVM 12 into main memory 16 vs. persistent storage 20. Within persistent storage 20, the LLB knows the size of spares area, firmware area (where the early stages of OS reside) and mass storage. While still running out of LLC-RAM, the LLB may perform the following actions to enable hardware to access NVM 12 (block 128): set up keys for hardware to be able to access main memory 16; set up page tables for hardware to access persistent storage 20 (e.g. the tables with translation data for the SOC-PA to Mem-PA; and provide hardware a pointer to the boundary of the spares area. At this point, hardware is capable of doing reads and writes to the NVM 12. Prior to the LLB performing the above actions, the SOC 10 may return an error response for writes to any location in NVM 12 and the NVM 12 may not perform the write. The LLB configures the SOC 10 and NVM 12 interface to run at full speed (block 130). The LLB configures the cache memory 22 interface and enables the cache (block 132). The LLB copies a boot image from persistent storage 20 into main memory 16. The boot image may include the code for further booting of the SOC 10 subsequent to completion of the LLB. Since the cache memory 22 is enabled, the boot image may be read from the NVM 12 into the cache (block 134). The LLB authenticates the boot image (block 136), and the LLB jumps to start of the boot image. The boot image starts to execute from the cache, sets up security policies, trustzone windows, read-only regions, etc. (block 138).

Figure 8:
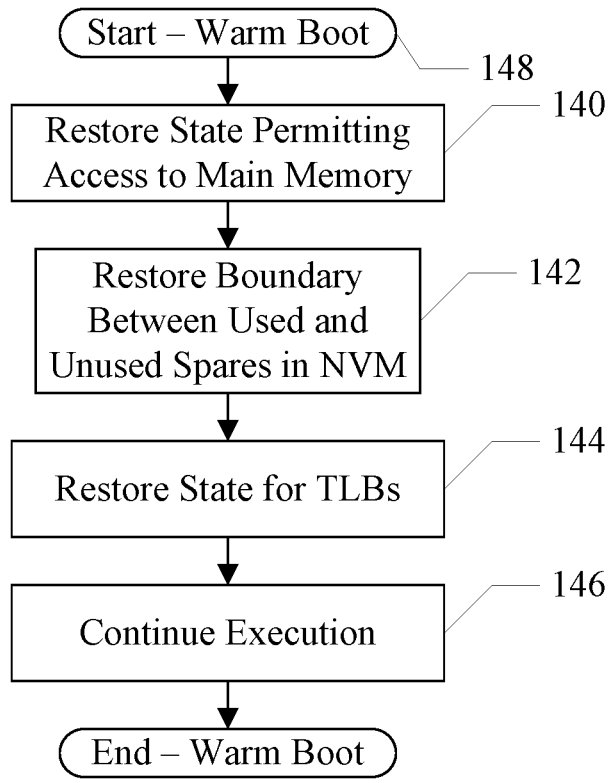
FIG. 8 is a flowchart illustrating one embodiment of a warm boot of the system.

In some embodiments, a warm boot may proceed as illustrated in the flowchart of FIG. 8 beginning at block 148. The main memory 16 state is preserved from prior to the warm boot. State that allows to SOC 10 to access the main memory 16 is saved in the always-on portion (AOP) of the SOC 10 (e.g. keys). The AOP is not shown in FIGS. 1-3, but may be a section of the SOC 10 that remains powered where the CPUs 34 and other components of the SOC 10 are powered down. State that allows the TLB to walk the SOC-PA to Mem-PA translation data structure 54 is saved in the AOP. State that indicates the current boundary between in use and unused spares is saved in the AOP. State that allows the SOC 10 to access the main memory 16 is restored from the AOP (block 140). However, state that allows the TLB to walk the SOC-PA to Mem-PA translation data structure 54 may not be restored yet. State that indicates the current boundary between used and unused spares is restored from AOP (block 142). State that allows the TLB to walk the SOC-PA to Mem-PA translation data structure 54 is restored from AOP (block 144). Execution in the operating system may then continue (block 146).

Figure 9:
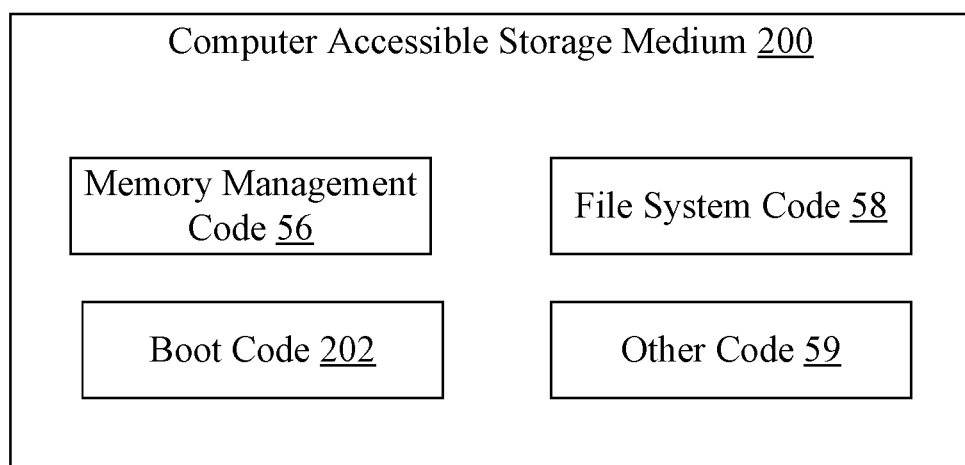
FIG. 9 is a block diagram of one embodiment of a computer accessible storage medium.

Turning now to FIG. 9, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile. In an embodiment, the computer accessible storage medium 200 may include one more of the NVM 12, the Flash memory 14, and/or the cache memory 22.

The computer accessible storage medium 200 in FIG. 9 may store the memory management code 56, the file system code 58, the other code 59, and/or boot code 202. The memory management code 56 may include instructions which, when executed by a CPU 36, implement the operation described for the memory management code 56 above. The file system code 58 may include instructions which, when executed by a CPU 36, implement the operation described for the file system code 58 above. The other code 59 may include instructions which, when executed by a CPU 36, implement the operation described for the other code 59 above. The boot code 202 include instructions which, when executed by a CPU 36, implement the operation described for the warm and cold boots above (e.g. with regard to FIGS. 6 and 7). A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A system comprising:
   a non-volatile memory; and
   a system on a chip (SOC) coupled to the non-volatile memory, the SOC including:
      one or more agents configured to generate read and write memory operations that address locations in the non-volatile memory, the locations forming a main memory in the system, wherein data in the main memory is defined to have a volatile behavior in which the data is non-persistent with each power down/power up cycle of the system;
      a link control circuit coupled to the one or more agents and configured to read and write the locations in the non-volatile memory responsive to the read and write memory operations; and
      a cryptographic circuit coupled to the one or more agents and the link control circuit, wherein the cryptographic circuit is configured to encrypt data written to the main memory in response to write memory operations from the one or more agents, and wherein the cryptographic circuit is configured to decrypt data read from the main memory in response to read memory operations from the one or more agents, and wherein the cryptographic circuit is configured to employ one or more keys for the encryption or decryption, and wherein the SOC is configured to implement the volatile behavior of the main memory by discarding the one or more keys responsive to a power down/power up cycle, which causes the data of the main memory to be declared lost due to the volatile behavior of the main memory.

2. The system as recited in claim 1 wherein the non-volatile memory is divided into a first portion addressed by the read and write memory operations and a second portion that is defined to be a persistent storage, and wherein the persistent storage is managed by a file system executed on the SOC.

3. The system as recited in claim 1 wherein a portion of the non-volatile memory is persistent storage, and wherein second data in the persistent storage is encrypted using one or more second keys separate from the one or more keys, and wherein the SOC is configured to retain the one or more second keys in a metadata area of the non-volatile memory.

4. The system as recited in claim 3 wherein the metadata area further stores initial vectors for use in the encryption or decryption of the second data in the persistent storage.

5. The system as recited in claim 3 wherein the SOC further comprises a metadata cache configured to cache data from metadata stored in the metadata area.

6. The system as recited in claim 1 wherein the data of the main memory is further declared lost responsive to one or more additional events in the system.

7. The system as recited in claim 1 wherein the SOC is configured to generate the one or more keys randomly during a power up event in the system.

8. The system as recited in claim 1 wherein a virtual address generated by one of the agents is translated through a first translation data structure to a first physical address and the first physical address is translated through a second translation data structure to a second physical address, and wherein a first page size in the first translation data structure differs from a second page size in the second translation data structure.

9. The system as recited in claim 8 wherein the first page size is less than the second page size.

10. The system as recited in claim 8 wherein the second page size matches a third page size implemented by the non-volatile memory.

11. The system as recited in claim 8 further comprising a cache control circuit configured to cache data from the non-volatile memory, wherein the cache is addressed by the first physical address.

12. The system as recited in claim 8 further comprising a cache control circuit configured to cache data from the non-volatile memory, wherein the cache is addressed by the second physical address.

13. A method comprising:
  generating read and write memory operations that address locations in a non-volatile memory by one or more agents in a system on a chip (SOC), the locations forming a main memory in a system that includes the SOC, wherein data in the main memory is defined to have a volatile behavior in which the data is non-persistent with each power down/power up cycle of the system;
  reading and writing the locations in the non-volatile memory responsive to the read and write memory operations by a link control circuit coupled to the non-volatile memory and the one or more agents;
  encrypting data written to the main memory in response to write memory operations from the one or more agents in a cryptographic circuit;
  decrypting data read from the main memory in response to read memory operations from the one or more agents in the cryptographic circuit; and
  implementing the volatile behavior of the main memory by discarding one or more keys employed in the encrypting and decrypting responsive to a power down/power up cycle, which causes the data of the main memory to be declared lost due to the volatile behavior of the main memory.

14. The method as recited in claim 13 wherein generating the read and write memory operations includes generating a virtual address, and the method further comprises:
  translating the virtual address through a first translation data structure to a first physical address; and
  translating the first physical address through a second translation data structure to a second physical address, wherein a first page size in the first translation data structure differs from a second page size in the second translation data structure.

15. The method as recited in claim 13 wherein the non-volatile memory is divided into a first portion addressed by the read and write memory operations and a second portion that is defined to be a persistent storage, the method further comprising managing the persistent storage by a file system executed on the SOC.

16. The method as recited in claim 13 wherein a portion of the non-volatile memory is persistent storage, the method further comprising:
  encrypting second data in the persistent storage using one or more second keys separate from the one or more keys; and
  retaining the one or more second keys in a metadata area of the non-volatile memory.

17. The method as recited in claim 16 further comprising storing initial vectors in the metadata area for use in the encryption or decryption of the data in the persistent storage.

18. The method as recited in claim 16 further comprising caching metadata from the metadata area in a metadata cache in the SOC.

19. The method as recited in claim 13 wherein the SOC is configured to generate the one or more keys randomly during a power up event.

\* \* \* \* \*